Patented June 25, 1935

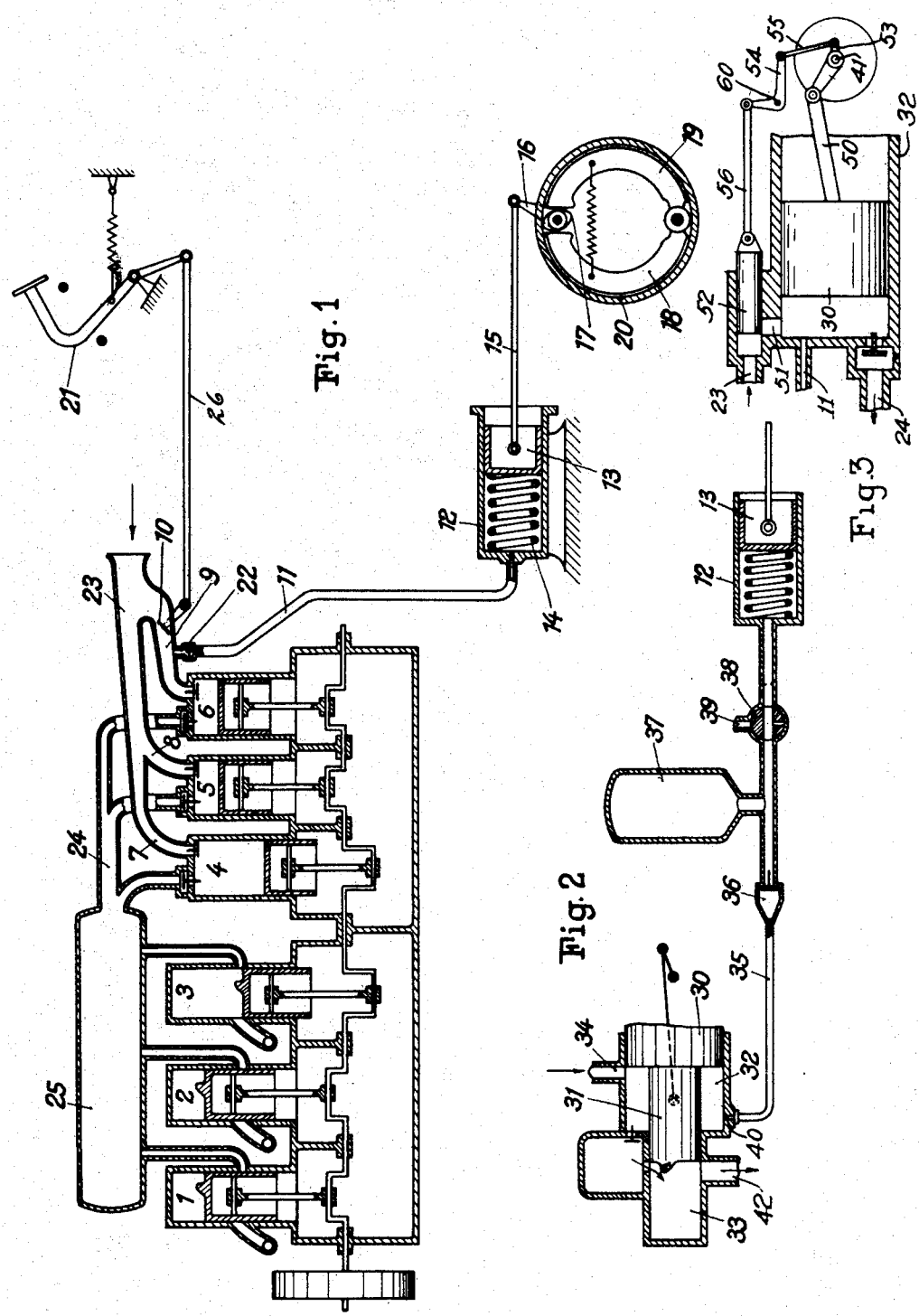

2,006,102

UNITED STATES PATENT OFFICE 2,006,102

BOOSTER BRAKE FOR VEHICLES

Hugo Junkers, Dessau, Germany

Application May 20, 1930, Serial No. 454,059
In Germany June 13, 1929

9 Claims. (Cl. 188—152)

My invention relates to booster brakes for vehicles, i. e. to brakes which are operated, in addition to their normal operation by levers or pedals, by pneumatic means in the suction system of the engine. In brakes of this type a brake cylinder is connected with the suction system so that the suction tends to operate the piston and to set the brake. Such systems have already been adapted to four-cycle engines.

It is an object of my invention, to adapt a booster system of the kind described to a two-cycle engine.

To this end I connect the brake with the suction system of the scavenging pump.

As a rule the vacuum in the suction system of the scavenging pump is not high and therefore I provide throttling means for increasing the vacuum. If the vacuum is as high as required, such means may be dispensed with.

In a four-cycle engine the booster system interferes with the engine only by reducing its power which is not a drawback. In a two-cycle engine, however, the throttling appears to interfere with the efficiency of the scavenging, resulting in incomplete combustion of the mixture. In theory this objection is justified, but in practice it is not important, as, more particularly if the brake is applied for a longer period, only the amount of fuel is admitted to the engine which is required for no-load running, and this amount is so small that it will be consumed completely, even if the scavenging is not normal.

Besides means may be provided for effecting complete combustion notwithstanding considerable throttling of the scavenging air. For instance the cylinders of the engine may be partly cut out while the brake is applied, so that the amount of scavenging air supplied to the cylinders which are still in operation is so large per cylinder that the combustion will be complete in the cylinders which are still active.

With a scavenging pump having several cylinders in parallel or with a double-acting scavenging pump, only part of the cylinders, for instance, one of the cylinders in a pump having its cylinders connected in parallel, or one side of a double-acting pump, is provided with throttling means in the suction pipe. In this case the reduction of the amount of scavenging air by the throttling is comparatively small and the combustion is not deteriorated.

In scavenging pumps having controlled suction ports the brake cylinder may be connected directly with the pump cylinder and throttling means may be dispensed with, as the vacuum in such pumps is high enough without throttling.

In the drawing affixed to this specification and forming part thereof my invention is illustrated as adapted to an engine having a separate scavenging pump, and to an engine having a scavenging pump which is combined with its cylinder or cylinders.

In the drawing

Fig. 1 is a section of an engine having an engine unit and a scavenging-pump unit at three cylinders each.

Fig. 2 is a section illustrating an engine cylinder in combination with the cylinder of a scavenging pump to which the booster brake is connected.

Fig. 3 represents an axial section of a modification of my invention in which a conventional reciprocating pump provided with slide valve is employed.

Referring now to the drawing and first to Fig. 1, 1, 2 and 3 are the cylinders of the engine unit, and 4, 5 and 6 are the cylinders of the scavenging-pump unit. The details of the engine and the pump will not be described as they have no bearing on the present invention.

23 is the suction manifold of the scavenging pump, 7, 8 and 9 are branch pipes extending from the manifold to the cylinders 4, 5 and 6, 24 is the compression manifold of the pump which is connected with the cylinders by branch pipes, and 25 is a reservoir for the scavenging air from which the three engine cylinders are supplied. The suction and delivery pipes of the cylinders are provided with the usual suction and delivery valves as indicated diagrammatically.

10 is a throttle which is provided in one of the suction branch pipes, in the present instance in the pipe 9 of the cylinder 6. 21 is a lever for operating the brake, which is here shown as a pedal, and 26 is a link which connects the throttle with the lever. 11 is a pipe which is connected with the branch pipe 9 at a point intermediate the throttle 10 and the cylinder 6, 12 is a brake cylinder, 13 is its piston, 14 is a spring inserted between the piston and the rear end plate of the cylinder, and 15 is a link connecting the piston 13 with the brake. The brake is here shown with a pair of brake blocks 18 and 19, a cam 17 for forcing apart the blocks against the action of a spring, a cam lever 16 to which the link 15 is pivoted, and a brake drum 20 for cooperation with the blocks 18 and 19.

The operation of my booster-brake is as follows: Normally the throttle 10 is full open and the scavenging pump delivers the normal amount of air to the reservoir 25. When the pedal 21 is operated the area of the pipe 9 is reduced to a greater or lesser extent by the throttle 10 so that the vacuum in the pipe 9 is intensified. This causes the piston 13 to be moved into the cylinder 12 by atmospheric pressure and against the reaction of its spring 14, whereupon the brake is applied by the link 15. The suction for the cylinders 4 or 5 is not interfered with.

Referring to Fig. 2, 30 is the piston of a scavenging pump, 31 is the engine piston which is of smaller diameter than the piston of the scavenging pump so that an annular suction and compression space is formed in the cylinder 32 of the pump. 33 is an engine cylinder in which the piston 31 is fitted to slide. 34 is a suction port in the cylinder 32, 40 is a delivery valve at the end of the cylinder, 37 is a reservoir to which the valve 40 delivers, and 42 is a scavenging port in the engine cylinder 33.

The vacuum in the pump cylinder 32 is rather intense during the stroke from the end of the cylinder to the suction port 34, as only the residual air in the clearance is expanded. This is due to the position of the port 34 which enters the cylinder 32 at a point near that end at which the piston is positioned at the end of its suction stroke. When in this position port 34, together with the piston 30, serve as means for causing an increased vacuum in the pump, performing the same function as the throttle 10 of Fig. 1. The air port of the usual scavenging pump is, of course, positioned at the suction end of the cylinder. 35 is a pipe line connecting the brake cylinder 12 with the pump cylinder 32. 36 is a check valve in the pipe line 35 which closes during the delivery stroke of the piston 30 so that the delivery pressure does not react on the piston 13 in the cylinder 12. An air vessel 37 may be connected with the pipe line 35 for equalizing the intermittent action of the pump 32. 38 is a two-way valve in the pipe line 35 by which the brake is controlled. In the position illustrated the bore of the valve 38 connects the cylinder 12 with the pump 32 and the brake is applied. When the valve 38 is rotated anti-clockwise to an angle of 90 degs. the cylinder 12 is connected with the atmosphere through a port 39 and the brake is inactive.

In Fig. 3, there is shown a conventional scavenger pump provided with a slide valve, this valve being capable of adjustment to retard the timing thereof which delays the inflow of air and thereby effects an increased vacuum in the pump cylinder during the first part of the suction stroke.

In Fig. 3, 32 is the cylinder and 30 is the piston of the reciprocating scavenging pump which is actuated from the shaft 41 through the medium of a crank and the connecting rod 50. 23 is the suction, and 24 is the delivery pipe of the pump. 51 is a suction port by which the cylinder 32 is connected to the suction pipe 23. 52 is the inlet valve which is here shown as a piston or slide valve. 53 is a valve-control crank on the shaft 41. 54 is a bell-crank lever which is mounted to rock about a pin 60. 55 is a link connecting the crank 53 to one end of the bell-crank lever, and 56 is a valve rod to which the other end of the bell-crank lever is pivotally connected.

The pipe 11 is connected to the suction end of cylinder 32. This pipe may be connected to the brake cylinder in the manner shown in Fig. 2.

Various conventional methods may be used to vary the timing of the slide valve and to thereby increase the vacuum in the pump cylinder. In the usual slide valve steam engine, for example, the timing is adjusted by varying the length of the valve stem (56) or eccentric rod (55), or by shifting the eccentric around the shaft. Any of these methods can be used in the apparatus of Fig. 3. One simple method of accomplishing this, for example, would be to merely shift the valve control crank 53 around the shaft 41. Crank 53, etc. would then serve as means for retarding the timing of air admission to said pump, thereby causing an increased vacuum in said pump, in accordance with the present invention.

It is to be understood that my brake, although it has been described as a "booster" may be used independently of the normal brake system of a vehicle.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof.

I claim:—

1. In a power plant comprising a scavenging pump operatively connected to a two-cycle internal combustion engine, means for causing an increased vacuum in said pump, and mechanism adapted to be operated by said increased vacuum.

2. In a power plant comprising a scavenging pump operatively connected to a two-cycle internal combustion engine, a suction pipe connected with said pump, means for causing an increased vacuum in said pump, and mechanism connected with said suction pipe and adapted to be operated under the control of said increased vacuum.

3. In a power plant comprising a scavenging pump operatively connected to a two-cycle internal combustion engine, a suction pipe connected with said pump, means for throttling said suction pipe, and mechanism connected with said suction pipe at a point intermediate said throttling means and said pump and adapted to be operated under the control of the increased vacuum in said suction pipe.

4. In a power plant comprising a scavenging pump operatively connected to a two-cycle internal combustion engine and having a plurality of cylinders, and a suction pipe connected to each cylinder of said pump; means for varying the air admission to one of said suction pipes so as to increase the vacuum in the corresponding cylinder, and mechanism connected with that suction pipe whose air admission is varied, and adapted to be operated under the control of said increased vacuum.

5. In a power plant comprising a scavenging pump operatively connected to a two-cycle internal combustion engine and having a plurality of cylinders, and a suction pipe connected to each cylinder of said pump; means for varying the air admission to one of said suction pipes so as to increase the vacuum in the corresponding cylinder, and mechanism connected with that suction pipe whose air admission is varied, at a point intermediate said means for varying the air admission and the corresponding cylinder, said mechanism being adapted to be operated under the control of said increased vacuum.

6. In a power plant comprising a scavenging pump operatively connected to a two-cycle internal combustion engine and including a cylinder and a piston mounted to reciprocate in said cylinder; a suction port near that end of said cylinder at which said piston is positioned at the end of its suction stroke, and mechanism adapted to be operated under the control of the vacuum in said pump and connected to said piston-swept portion near the opposite end of said cylinder.

7. In a power plant comprising a scavenging pump operatively connected to a two-cycle internal combustion engine and means for throttling only a portion of the air drawn into said scavenging pump.

8. In a power plant comprising a scavenging pump operatively connected to a two-cycle internal combustion engine, valve mechanism for controlling air admission to said pump, means operatively connected to said mechanism for retarding the timing of air admission to said pump, thereby causing an increased vacuum in said pump, and mechanism connected to said pump and operated by said increased vacuum.

9. The apparatus of claim 8 wherein the mechanism for controlling air admission into said pump is a slide valve.

HUGO JUNKERS.